United States Patent
Russell et al.

(10) Patent No.: US 6,771,607 B1
(45) Date of Patent: Aug. 3, 2004

(54) MEASURE AND RECORDING OF TRAFFIC PARAMETERS IN DATA TRANSMISSION NETWORKS

(76) Inventors: Raymond Philip Russell, Sezimbra, Thormanby Road, Howth, Dublin 13 (IE); Ian Edward Dowse, 15 Tivoli Terrace East, Dun Laoghaire, County Dublin (IE)

(*) Notice: Subject to any disclaimer, the term of this patent is extended or adjusted under 35 U.S.C. 154(b) by 797 days.

(21) Appl. No.: 09/608,108

(22) Filed: Jun. 30, 2000

(51) Int. Cl.$^7$ .............................................. G01R 31/08
(52) U.S. Cl. .................................... 370/252; 370/386
(58) Field of Search ................................ 370/235, 252, 370/253, 537, 358, 254, 411, 487, 497, 386, 232, 233, 234; 709/224

(56) References Cited

U.S. PATENT DOCUMENTS 5,434,845 A 7/1995 Miller ......................... 370/13

FOREIGN PATENT DOCUMENTS

EP 0837578 A2 4/1998

Primary Examiner—Wellington Chin
Assistant Examiner—Brenda Pham
(74) Attorney, Agent, or Firm—Jacobson Holman PLLC

(57) ABSTRACT

The invention relates to a method and apparatus for measuring and recording traffic at nodes in a data transmission network. In particular the invention provides a method of accurately counting individual activities of traffic at individual nodes. The invention is carried out in hardware by using a counter or number of counters which count individual activities of traffic on a preset activity condition being sensed at a node. The invention has the advantage that accurate measurement of traffic at a node is achieved. The invention is also easy to implement in hardware and overcomes the problems inherent in present software solutions.

20 Claims, 3 Drawing Sheets

MEASURE AND RECORDING OF TRAFFIC PARAMETERS IN DATA TRANSMISSION NETWORKS

BACKGROUND OF THE INVENTION

The present invention relates to a method of measuring and recording various parameters of traffic at nodes in a data transmission network. It also relates to the provision of a sampling circuit for the measurement and recording of such traffic parameters.

FIELD OF THE INVENTION

Any data transmission network comprises switches or routers in which traffic is carried in flows defined by identifiers, which may be VC/VP pairs in an ATM switch, source or destination address pairs in an IP router or a logical prefix-based aggregations of source or destination addresses. Traffic management schemes are based on measurement of traffic load and for such schemes to work effectively, the measurement must be accurate. The most fundamental form of measurement is a sample of the bit-rate of the traffic and the timescale over which such a measurement is made determines how much information can be deduced from it. If the timescale is relatively long such as the order of hours or days, then all that can be deduced is the average traffic load and the measurement tells nothing whatsoever of the typical delays or indeed packet-drop rates. In order to deduce the latter, sampling of the traffic rate must take place using a timescale at which packet queuing occurs, namely, that of the order of tens of milliseconds. Making accurate rate-measurements in such timescales is extremely challenging and difficult. Current networking hardware can count various quantities relating to traffic streams, such as the number of arriving packets and arriving bytes. In order to make bit-rate measurements, software within the switch or router operating system must poll the byte counter, read the system time, set the software timeout and then read the byte counter and system time again. The bit-rate sample is then calculated as the ratio of $$\frac{\text{final byte-count} - \text{initial byte-count}}{\text{final time} - \text{initial time}}$$

Unfortunately, with a software-based system, there are a number of serious problems.

Firstly, it can be difficult to arrange for software times to expire accurately at a timescale of 10 ms. Even if such software timers are accurate, the architecture does not scale well. If the counting process is handling many counts at once, it needs to use its timer many times, namely, once for each count. When the counter periods overlap, the actual timeout periods may be much shorter than the timescale of the count, namely, 10 ms, mentioned already, for any individual count. Thus, in practice, many counts will interfere with each other in software leading to reduced accuracy for all the counts.

A further problem is that even if the number of counts is such that they can be handled correctly, it is virtually impossible to guarantee that the times in which the byte counters are read will be recorded or clocked accurately. Effectively, any process embodied in software will be programmed to poll the byte counter and then immediately read the system clock. However, there is no guarantee that the actual process will not be preempted by another process having a higher priority or by a hardware interrupt between polling the counter and reading the clock. Obviously, if the counting process is preempted, it makes the current count unusably inaccurate. A further problem is that typically there will be no record of this interrupt and thus the process cannot discard that particular faulty count and reject it but it will be used for further processing.

Finally, a major drawback inherent in using software alone is that even if the counting and timing could be carried out accurately, there is a limitation in that, in effect, rate samples can only be taken over specified periods of time. It is important in some applications to be able to time, for example, how long it takes for a fixed number of bytes to arrive which latter is impossible to achieve in software without a busy loop constantly polling the bye counter, which would effectively leave the CPU unusable for any other purpose. Accordingly, carrying out such a task by way of software alone is relatively useless for traffic management.

OBJECTS

The present invention is directed towards providing a method and apparatus for rate sampling by measuring and recording various parameters of traffic at at least some of the nodes in a data transmission network.

SUMMARY OF THE INVENTION

According to the invention, there is provided a method of measuring and recording various parameters of traffic at at least some of the nodes in a data transmission network in a rate sampling piece of hardware. Such nodes would be network switch routers, destination addresses, and so on. At least some of the nodes in the data transmission network are connected to at least one system counter provided in software. In this case, the method comprises enabling a group of counters; counting various individual activities of the traffic at the node as separate system activity counts; and providing a simultaneous real time count. The method comprises causing each counter to be disabled on a pre-set activity condition being sensed at the node; reading the count recorded at the node for the real time between the enabling and disabling of the counter; reading the real time elapsed during said count; storing the count and time read as traffic data; and re-enabling the counter to continue with the next count.

Carrying out the invention in hardware overcomes all the problems in present software solutions.

Ideally, on disabling a counter, one or more are disabled and the traffic data for the or each of said counters is stored. Many pre-set activity count condition sensed can be used such as the real time elapsed since enabling the counter, the number of bytes counted since enabling the counter, and the number of data packets counted since enabling the counter.

Ideally, all the system activity counts are carried out simultaneously at the node by disabling all counters connected to the node once one counter is disabled and enabling all the counters connected to the node when any of the counters connected to the node is enabled.

Alternatively, all the system activity counts are carried out simultaneously over the same time period by disabling all counters on any one of a number of pre-set activity count conditions being sensed at the nodes and enabling all counters simultaneously when any one counter is enabled.

It will be appreciated that the method will also include computing traffic data from the traffic parameters and storing the traffic data for subsequent retrieval. The amount of computation used will depend entirely on the hardware being used.

Further, the invention provides a sampling circuit for the measurement and recording of traffic parameters as system activity counts at a node in a data transmission network comprising:

- a plurality of separately operable hardware counters, each for counting a specific system activity count at the node;
- a time counter having an input signal in the form of a clock operating at fixed interval;
- operating circuit means for enabling and disabling the operation of each counter;
- recording circuit means for the individual counts read at the counter for the real time between the enabling and disabling of each counter; and
- storage circuit means for the individual counts.

There is also provided computational circuit means for calculating traffic parameters for the network.

The operating recording and storage circuit means is carried out by a programmable control circuit.

The counters may be combined into a counter assembly comprising at least one system counter but more likely at least two system counters. Ideally these are a system counter for counting bytes and a system counter for counting packets and always a time counter. It is envisaged that dedicated multiplexors may be used for monitoring and detecting the output of each system counter measured in the number of bits. Such as system counter will ideally be provided by an addressable register.

In one embodiment of the invention, the sampling circuit comprises:

- a plurality of addressable registers forming a time counter and at least one system counter;
- a multiplexor connected to each counter;
- a global multiplexor connected to each per-counter multiplexor;
- a control register connected to each multiplexor the control register being programmed to configure each node multiplexor to handle the bits at each counter in accordance with a pre-set count condition and to assert an inhibit and re-set signal for transmission to each counter on sensing the pre-set count condition;
- the control register being programmed to configure the global multiplexor to combine the outputs of node multiplexors to assert the inhibit and re-set signal; and
- circuit counting means for the individual system activity counts in real time.

DESCRIPTION OF PREFERRED EMBODIMENTS

Figure 1:
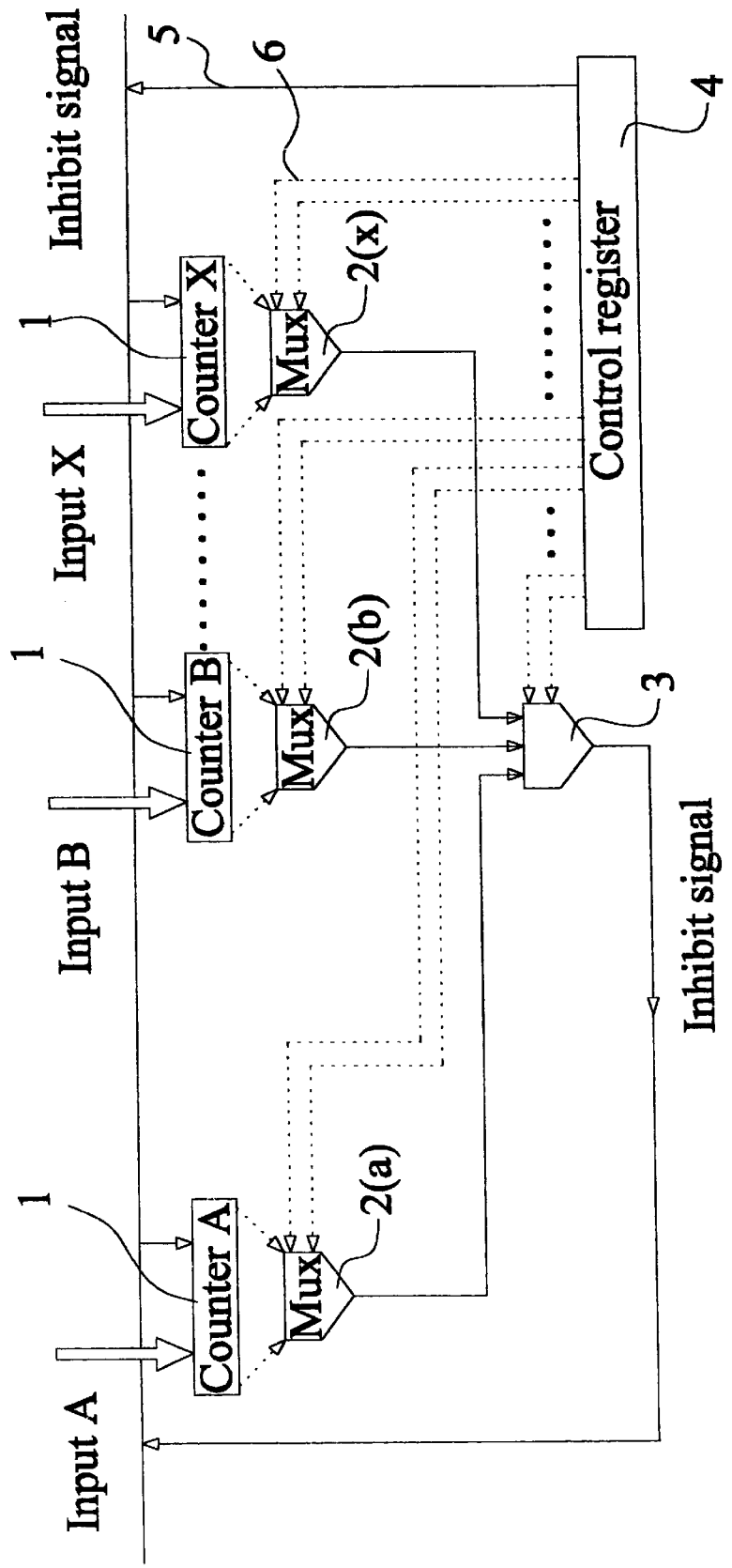
FIG. 1 is a block diagram showing the hardware used to carry out the invention.

Referring to the drawings, there is provided a plurality of counters labeled in FIG. 1 Counter A, Counter B and Counter X, each formed by an addressable register $1(a)$, $1(b)$ and $1(x)$, each counter being connected to a multiplexor $2(a)$, $2(b)$ and $2(x)$. All multiplexors $2(a)$ to $2(x)$ feed a further selection logic formed by an additional global multiplexor 3. Also provided is a control register 4 which is used for overall control of the unit to configure each of the multiplexors, inhibit signals feeding each of the counters and then reset signals. The inhibit signal is shown by a full line 5 and the other signals by interrupted lines 6. The counters A to X can copy various traffic, for example, referring to FIG. 2, there is shown three counters, the counter $1(a)$ being a byte counter, counter $1(c)$ being a clock counter, controlled effectively by a control logic which can send off reset signals and inhibit signals to the various counters. In turn, the control logic will be connected to the control register 4. As the packets arrive, the total byte count is summed in the byte counter. Each packet arrival causes the packet counter to be incremented and the time counter is clocked at a fixed frequency. This arrangement allows rate-samples to be made over fixed traffic volumes, whether bytes or packets, as easily as over fixed times; such measurements are vital to implementing efficient traffic management schemes.

The control register specifies a single bit which is to be monitored in each of the three counters to set as an activity condition. When the control logic detects that any of these bits has become active, it asserts the inhibit signal causing all counters to be frozen. After the counters have been read by the software, a write to the control register could reset the counters and de-assert the inhibit signal. This arrangement could accurately measure rate samples over a fixed time period by setting the control register so that a bit in the time counter is monitored. To measure rate samples over a fixed number of packets or bytes, the control register could be set to that the number of the byte or packet counters is monitored to form the pre-set activity condition for disabling some or all of the counters. Obviously, the low-order bits of the byte counters would not normally be used.

Figure 2:
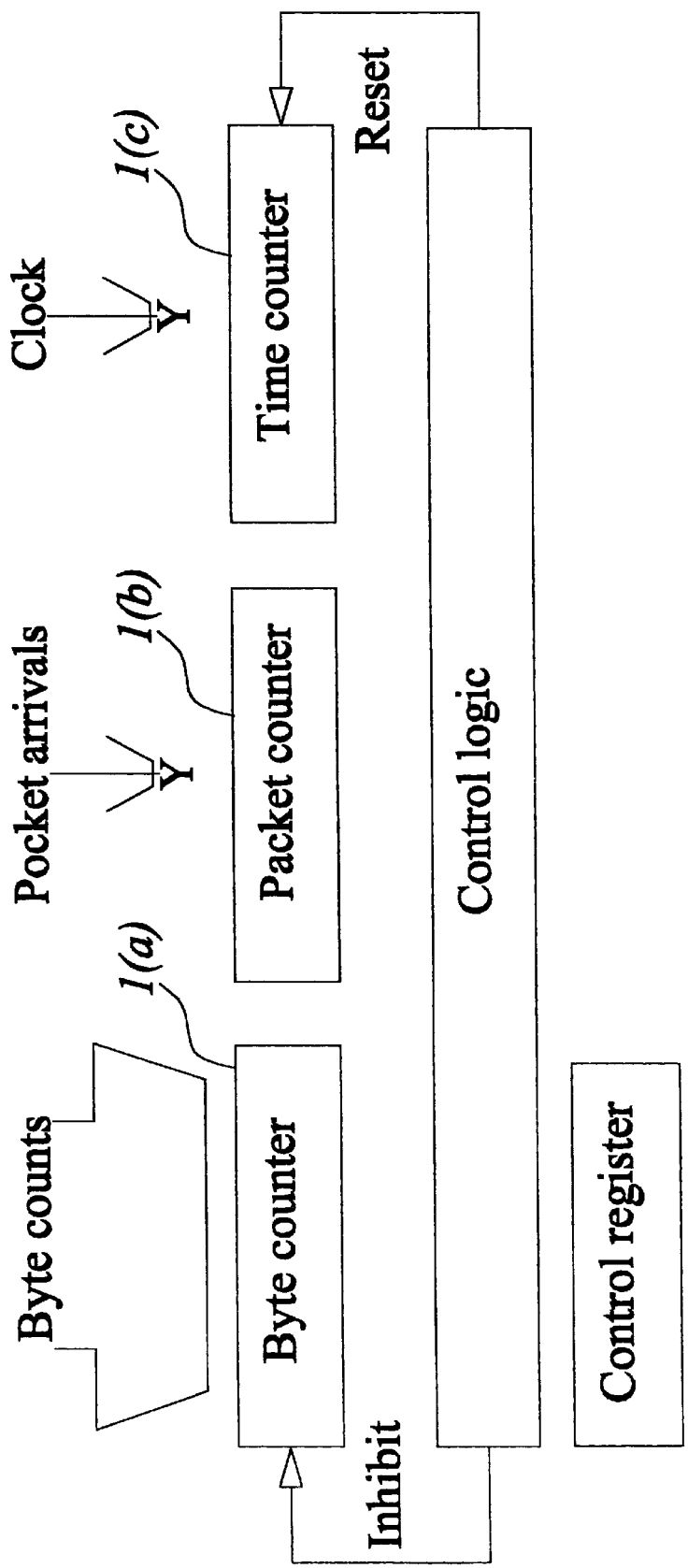
FIG. 2 is a block diagram showing in outline the operation of the invention.
Figure 3:
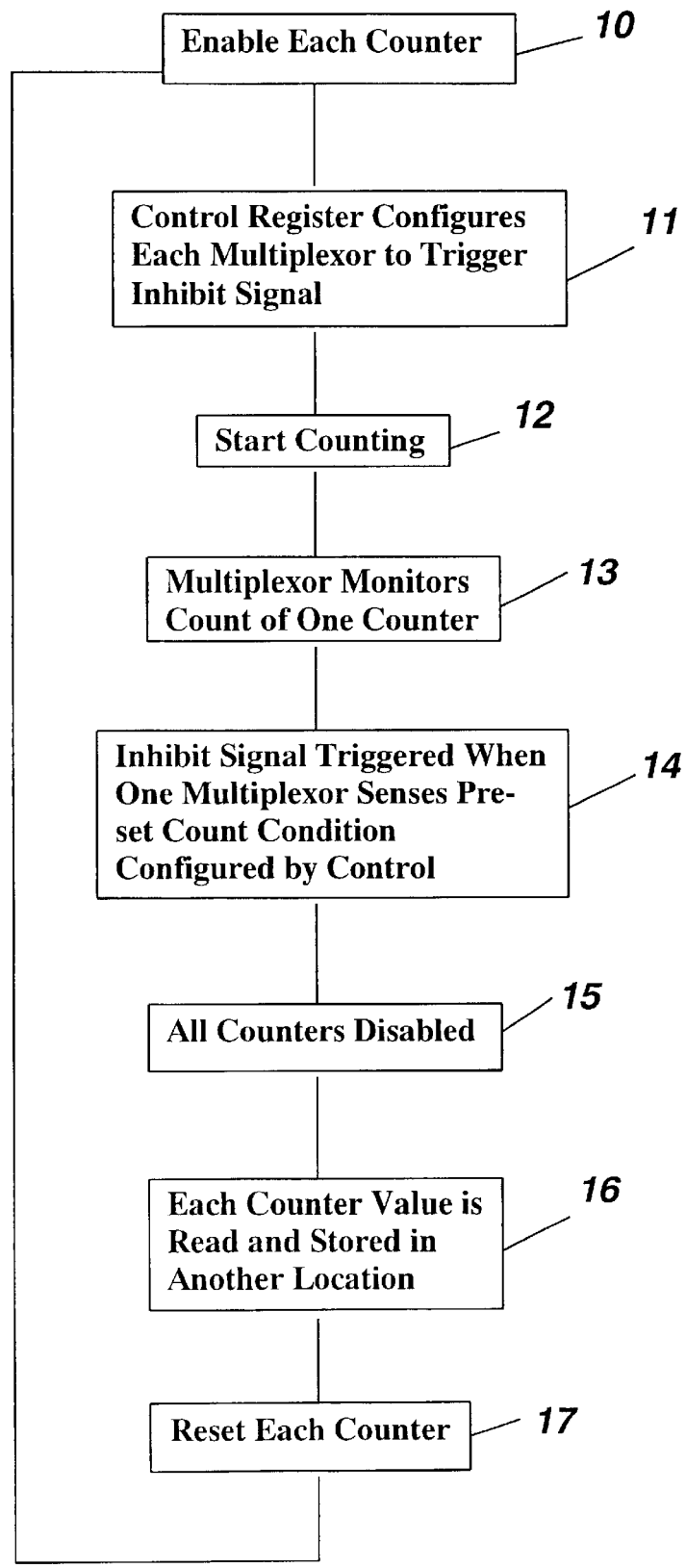
FIG. 3 is a flow diagram showing one method according to the invention.

Referring now to FIG. 2 and FIG. 3, in step 10, each counter is enabled and in step 11 the control register configures each multiplexor to trigger an inhibit signal. In step 12, they start counting. The multiplexors $2(a)$ monitor the count at their respective counters, thus the multiplexor $2(a)$ monitors the count at the counter $1(a)$ and so on. When one of the multiplexors senses a preset count condition which has already been configured by the control register, it asserts its output, causing the global multiplexor to deliver the inhibit signal to all counters. Thus, for example, the condition sensed was the real time elapsed, then whichever was the counter carrying out the time functions which could, for example, be the counter $1(x)$, then the multiplexor $2(x)$ would assert its output to the global multiplexor in step 14 and then in step 15 the global multiplexor simultaneously disables all counters. In step 16, each counter value is read and stored in another location and in step 17, each counter is reset.

Essentially, the invention consists of an arbitrary number of hardware registers coupled by control logic to allow the parallel counting of any number of parameters. Any arbitrary number of characters can be used in the sample and connected to the desired inputs. As mentioned above, one counter could be used to count elapsed time and is clocked at a fixed frequency and another counter could be used to count the number of bytes arriving on a flow on a network element. A central piece of control logic links all the counters and may assert an inhibit signal to a counter or may enable a counter and indeed the logic will normally reset any of the counters setting its value at zero before resetting. Similarly the logic may monitor any bit of any of the counters. It will also be appreciated that the logic allows operations to be performed simultaneously on any subset of counters. It might allow all the counters to be frozen at a given signal and then allow only some of the frozen counters to be reset.

The invention allows accurate rate-measurements over a specified interval of time. The logic can be arranged so that all the counters are initially frozen, reset and then simultaneously started. For example, a bit in the time counter is monitored and as soon as that bit is set, all counters are simultaneously frozen again. The counters can then be read and their values divided by the elapsed time recorded by the counter to give accurate rate measurements. In this way, an accurate measure of the data rate of a network flow may be obtained.

The invention also allows accurate rate measurements over intervals of time defined by the quantity to be measured. For example, it is possible to measure the length of time taken for a specified number of bytes to arrive on a given flow to measure the length of time it takes for $2^n$ bytes to arrive; simply reset all counters, set them all going simultaneously and then monitor the n'th bit of the byte counter. It will be appreciated that the logic will allow more complicated specifications of timings to be performed. For example, one could measure until a given length of time has passed or until a given number of bytes or packets have arrived on a flow, one could monitor bits in both the time counter and the bye counter, apply a logical OR to them and use the result to trigger a freeze of all counters.

Essentially, what the invention is a hardware solution to a problem in the present method of measuring and recording various parameters of traffic data at nodes on a data transmission network which methods have heretofore been carried out in softwares which have led to inherent problems. The count is timed in hardware that it is exact, each count is performed on a dedicated piece of hardware, probably silicon, and since this is a relatively simple thing to do, there is no problem in scaling it up since all that is required is a small amount of silicon, three registers or more and some logic from any applications. The byte count and clock are synchronised hardware giving perfect precision and the hardware arrangement allows fixed volume counts to be performed as easily as fixed time counts.

In the specification the terms "comprise, comprises, comprised and comprising" or any variation thereof and the terms "include, includes, included and including" or any variation thereof are considered to be totally interchangeable and they should all be afforded the widest possible interpretation.

The invention is not limited to the embodiments hereinbefore described but may be varied in both construction and detail.

What is claimed is:

1. A method of measuring and recording various parameters of traffic at at least some of the nodes in a data transmission network in which each of said nodes is connected to at least one system counter comprising:

enabling a counter;

counting various individual activities of the traffic at the node as separate system activity counts;

providing a simultaneous real time count;

causing each counter to be disabled on a pre-set activity condition being sensed at the node;

reading the count recorded at the node for the real time between the enabling and disabling of the counter;

reading the real time elapsed during said count;

storing the count and time read as traffic data; and re-enabling the counter.

2. A method as claimed in claim 1 in which on disabling the counter, one or more other counters are disabled and the traffic data for the or each of said counters is stored.

3. A method as claimed in claim 2 in which the pre-set activity count condition sensed is the real time elapsed since enabling the counter.

4. A method as claimed in claim 2 in which the pre-set activity count condition is determined by the number of bytes counted since enabling the counter.

5. A method as claimed in claim 2 in which the pre-set activity count condition is the number of packets of information counted since enabling the counter.

6. A method as claimed in claim 2 in which all the system activity counts at one node is carried out simultaneously at the node by:

disabling all counters connected to the node once one counter is disabled; and enabling all the counters connected to the node when any of the counters connected to the node is enabled.

7. A method as claimed in claim 2, in which all the system activity counts are carried out simultaneously over the same time period by:

disabling all counters on any one of a number of pre-set activity count conditions being sensed at the nodes; and enabling all counters simultaneously when any one counter is enabled.

8. A method as claimed in claim 2, in which subsequently the steps are performed of:

computing traffic data from the traffic parameters; and storing the traffic data for subsequent retrieval.

9. A method of measuring and recording various parameters of traffic at at least some of the nodes in a data transmission network in which each of said nodes is connected to at least one system counter comprising:

enabling all counters;

counting various individual activities of the traffic at the nodes as separate system activity counts;

providing a simultaneous real time count at each node;

causing one of the counters to be disabled on a pre-set activity condition being sensed at the node;

disabling all the other counters;

reading the count recorded at the nodes for the real time between the enabling and disabling of the counter;

reading the real time elapsed during said count;

storing the count and time read as traffic data;

re-enabling one of the counters; and enabling all the other counters.

10. A method as claimed in claim 9 in which the pre-set activity count condition sensed is the real time elapsed since enabling the counter.

11. A method as claimed in claim 9 in which the pre-set activity count condition is determined by the number of bytes counted since enabling the counter.

12. A method as claimed in claim 9 in which the pre-set activity count condition is the number of packets of information counted since enabling the counter.

13. A method as claimed in claim 9, in which subsequently the steps are performed of:

computing traffic data from the traffic parameters; and storing the traffic data for subsequent retrieval.

14. A sampling circuit for the measurement and recording of traffic parameters as system activity counts at a node in a data transmission network comprising:

a plurality of separately operable system counters, each for counting a specific system activity count at the node;

a time counter having an input signal in the form of a clock operating at fixed interval;

operating circuit means for enabling and disabling the operation of each counter;

recording circuit means for the individual counts read at the counter for the real time between the enabling and disabling of each counter; and storage circuit means for the individual counts.

15. A sampling circuit as claimed in claim 14 in which there is provided computational circuit means for calculating traffic parameters for the network.

16. A sampling circuit as claimed in claim 14 in which the operating recording and storage circuit means is carried out by a programmable control circuit.

17. A sampling circuit as claimed in claim 14 in which the counters are combined in a counter assembly comprising at least one system counter and a time counter.

18. A sampling circuit as claimed in claim 17 in which the counter assembly comprises a time counter, a system counter for counting bytes and a system counter for counting packets of information.

19. A sampling circuit as claimed in claim 17 in which there is provided a dedicated multiplexor for monitoring and detecting the output of each system counter measured in the number of bits.

20. A sample circuit as claimed in claim 17 in which each system counter is an addressable register.

* * * * *